United States Patent [19]
Yamane et al.

[11] Patent Number: 5,289,202
[45] Date of Patent: Feb. 22, 1994

[54] MAGNETIC RECORDING APPARATUS AND MAGNETIC RECORDING MEDIUM WITH A FILM TO BE VERTICALLY MAGNETIZED SANDWITCHED WITH SOFT MAGNETIC FILMS

[75] Inventors: Haruki Yamane; Yoshinori Maeno; Kayoko Sato; Masanobu Kobayashi, all of Tokyo, Japan

[73] Assignee: Oki Electric Industry Co., Ltd., Tokyo, Japan

[21] Appl. No.: 869,440

[22] Filed: Apr. 16, 1992

[30] Foreign Application Priority Data

Apr. 16, 1991 [JP] Japan .................................. 3-084002
Nov. 8, 1991 [JP] Japan .................................. 3-292877

[51] Int. Cl.$^5$ ............................ G11B 9/00; G11B 5/74
[52] U.S. Cl. ...................................... 346/74.3; 360/131
[58] Field of Search ............... 346/74.2, 74.3, 74.4; 360/131-136

[56] References Cited

U.S. PATENT DOCUMENTS

| | | | |
|---|---|---|---|
| 3,878,367 | 4/1975 | Fayling et al. | 346/74.3 X |
| 3,972,715 | 8/1976 | Okumura | 346/74.3 X |
| 4,371,590 | 2/1983 | Izumi et al. | 360/134 X |
| 4,628,328 | 12/1986 | Takahashi et al. | 346/74.4 |
| 4,678,722 | 7/1987 | Cohen | 360/135 X |
| 4,908,809 | 3/1990 | Tadokoro et al. | 360/131 X |
| 5,016,232 | 5/1991 | Tadokoro et al. | 360/131 X |

FOREIGN PATENT DOCUMENTS 1-015907 1/1989 Japan .
WO87/03728 6/1987 PCT Int'l Appl. .

OTHER PUBLICATIONS

"The Fourth International Congress on Advances in Non-impact Printing Technologies", Mar. 20-25, 1988, New Orleans, La., USA, Christine Camelin, pp. 555-562.

Primary Examiner—George H. Miller, Jr.
Attorney, Agent, or Firm—Wenderoth, Lind & Ponack

[57] ABSTRACT

A magnetic recording medium having a triple layered structure including a substrate, a first layer or a soft magnetic thin film of high permeability piled on the substrate, a second layer or a vertical magnetization film piled on the first layer, a third layer or a soft magnetic film of high permeability piled on the second layer. A magnetic recording apparatus alternately switches the magnetization orientations of the second layer or the vertical magnetization film at a recording location where a latent image is to be formed. The first and third layer or the soft magnetic thin films can improve recording efficiency. The field produced by the second layer or the vertical magnetization film causes the third layer or the soft magnetic thin film to be magnetized along the surface of the magnetic recording medium, and this results in the concentration of the flux owing to switching of the magnetization directions. This enables high density recording and improves recording sensitivity and reproducing sensitivity.

5 Claims, 20 Drawing Sheets

TRIPLE LAYERED STRUCTURE

MAGNETIC RECORDING APPARATUS AND MAGNETIC RECORDING MEDIUM WITH A FILM TO BE VERTICALLY MAGNETIZED SANDWITCHED WITH SOFT MAGNETIC FILMS

BACKGROUND OF THE INVENTION

1. Field of the Invention

The present invention relates to a magnetic recording apparatus and a magnetic recording medium for use in the recording apparatus.

2. Description of the Prior Art

Conventionally, a magnetic recording medium is used in a type of magnetic printer in which a magnetic latent image is formed on a magnetic recording medium to be developed to a visible image, for example. See, Shunji Imamura, "Chapter 15 Magnetography Printer", *Nonimpact Printing*, pp. 159–168, CMC, Japan, 1986.

A magnetic printer includes, generally, a recording magnetic drum which is rotatable about its central axis, and has its circumferential surface coated with a magnetic recording medium made from a thin film of $CrO_2$ or the like on which a latent image is magnetically formable. In the printing process, an erasing device, provided in opposite to the peripheral surface of the recording medium, initially magnetizes the recording medium in a predetermined magnetic orientation. Then, a magnetic recording head forms a magnetic latent image on the recording medium in response to an image signal, and a developer unit processes in turn the latent image into a visible image by supplying toners to the magnetic latent image on the magnetic recording medium. The toners will adhere to portions at which magnetic forces produced by the leaked magnetic field on the surface of the magnetic recording medium intersect the surface of the magnetic recording medium. Thus, the magnetic latent image is developed to a visible image. Following this, the toners forming the visible image on the recording medium is transferred onto a sheet of paper, and fixed on the latter. Finally, remaining toners are cleaned out from the magnetic recording medium, thus completing the printing process.

A magnetic latent image can be formed on a magnetic recording medium not only by the method using a magnetic head, but also by a method using a thermal magnetic head which is adapted to directly heat a magnetic recording medium by a thermal head or a laser beam irradiating the recording medium. The magnetic recording medium can be magnetized in two different orientations: one mainly along the circumferential surface of the recording medium as is referred to as the longitudinal recording method; and the other in the direction substantially perpendicular to the surface of the recording medium as referred to as the vertical recording method. The vertical recording method can in principle achieve highly stable recording with high resolution.

In the vertical recording method, a higher recording efficiency and resolution can be achieved by a proposed method in which a magnetic flux is concentrated by a magnetic recording medium undercoated with a soft magnetic film of high permeability. FIG. 2 plots the vertical components of magnetic force established on the recording medium with respect to the magnetized orientation, which is schematically illustrated in the lower portion of the figure. In this figure, solid arrows 50 and a solid curve 52 indicate the magnetized orientations and the vertical components of the magnetic force in the longitudinal recording method, respectively, whereas phantom arrows 54 and a broken curve 56 indicate corresponding ones in the vertical recording method.

As shown in FIG. 2, in the conventional magnetic recording apparatus and magnetic recording medium, the longitudinal recording method can achieve recording by attracting toners which are a magnetic material by using leaked magnetic flux produced at boundaries B where the direction of magnetization reverses. In contrast, the vertical recording method cannot achieve high density recording, even where domains in which the magnetized orientation is switched are formed, because of small changes in magnetic force at the domains.

SUMMARY OF THE INVENTION

It is therefor an object of the present invention to provide a magnetic recording apparatus and a magnetic recording medium for the vertical recording which can achieve high resolution, high efficiency, low power consumption recording of images with the disadvantages of the conventional magnetic recording apparatus and magnetic recording medium removed.

According to a first aspect of the present invention, there is provided a magnetic recording apparatus comprising: (a) a magnetic recording medium having a surface; (b) magnetic recording means disposed in opposition to the surface of said magnetic recording medium for forming a magnetic latent image in the surface of said magnetic recording medium; and (c) developing means for forming a visible image by attracting toners on the magnetic latent image, said magnetic recording medium including, a substrate having a surface; a first layer made of a soft magnetic film of a high permeability and piled on the surface of said substrate; a second layer of material, piled on said first layer, in which magnetization can be oriented substantially vertically to the second primary surface; a third layer made of a soft magnetic film of a high permeability and piled on said second layer to form the first primary surface; said magnetic recording means being adapted to alternately switch, when forming the magnetic latent image, magnetization directions at recording locations of said second layer where the magnetic latent image is to be formed.

According to a second aspect of the present invention, there is provided a magnetic recording medium comprising: (a) a substrate having a primary surface; (b) a first layer made of a soft magnetic film of a high permeability and piled on the primary surface of said substrate; (c) a second layer of material, piled on said first layer, in which magnetization can be oriented substantially vertically to the primary surface; and (d) a third layer made of a soft magnetic film of a high permeability and piled on said second layer.

Here, the thickness of the first layer may be set between 0.01 and 10 micrometers inclusive, thickness of the second layer is set between 0.3 and 5 micrometers inclusive, and thickness of the third layer is set between 50 and 3000 angstroms inclusive.

At least one of the first layer and the third layer may be made of iron nitride thin film.

The iron nitride thin film may be defined by a formula $Fe_{100-x}N_x$, where x falls in a range of 1 through 15 atom %.

According to the present invention, when the magnetic recording means alternately switches the magnetization directions of the second layer or the vertical magnetization layer at the recording location where an magnetic latent image is to be formed, magnetization along the recording medium takes place in the third layer or the soft magnetic thin film, thereby concentrating the magnetic flux at the recording location. As a result, the recording sensitivity and the reproduction sensitivity are increased. This enables high resolution, low power consumption and high speed recording.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
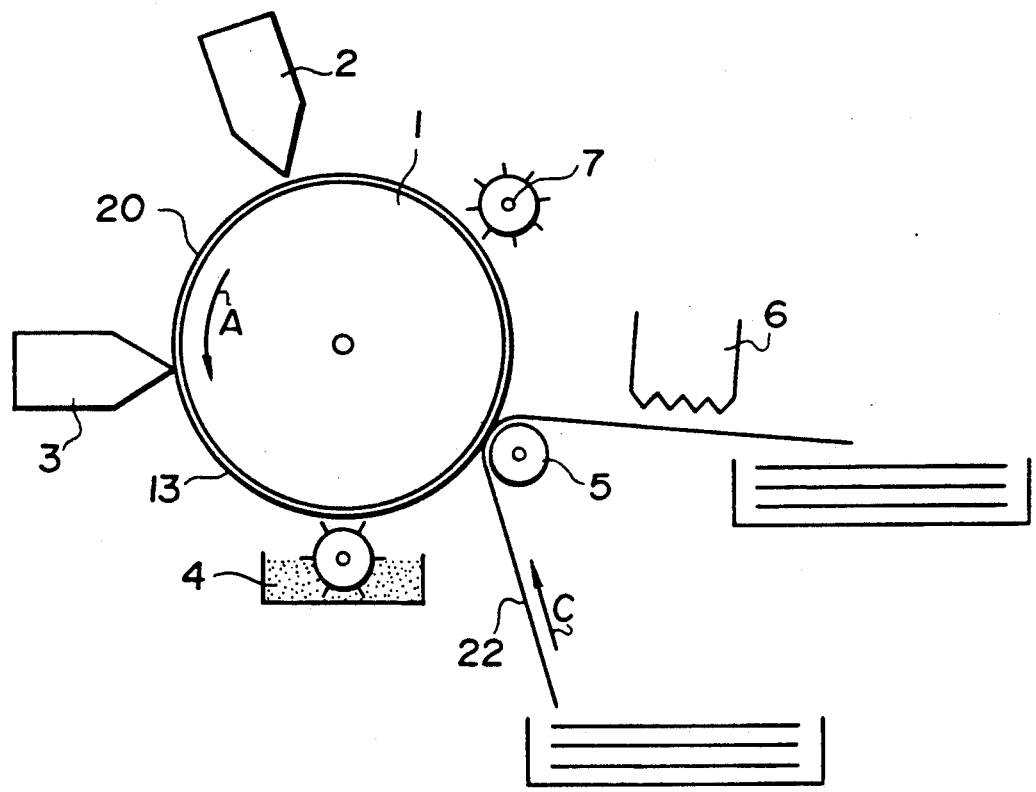
FIG. 1 is schematically illustrates an embodiment of a magnetic printer to which the present invention is applied.
Figure 2:
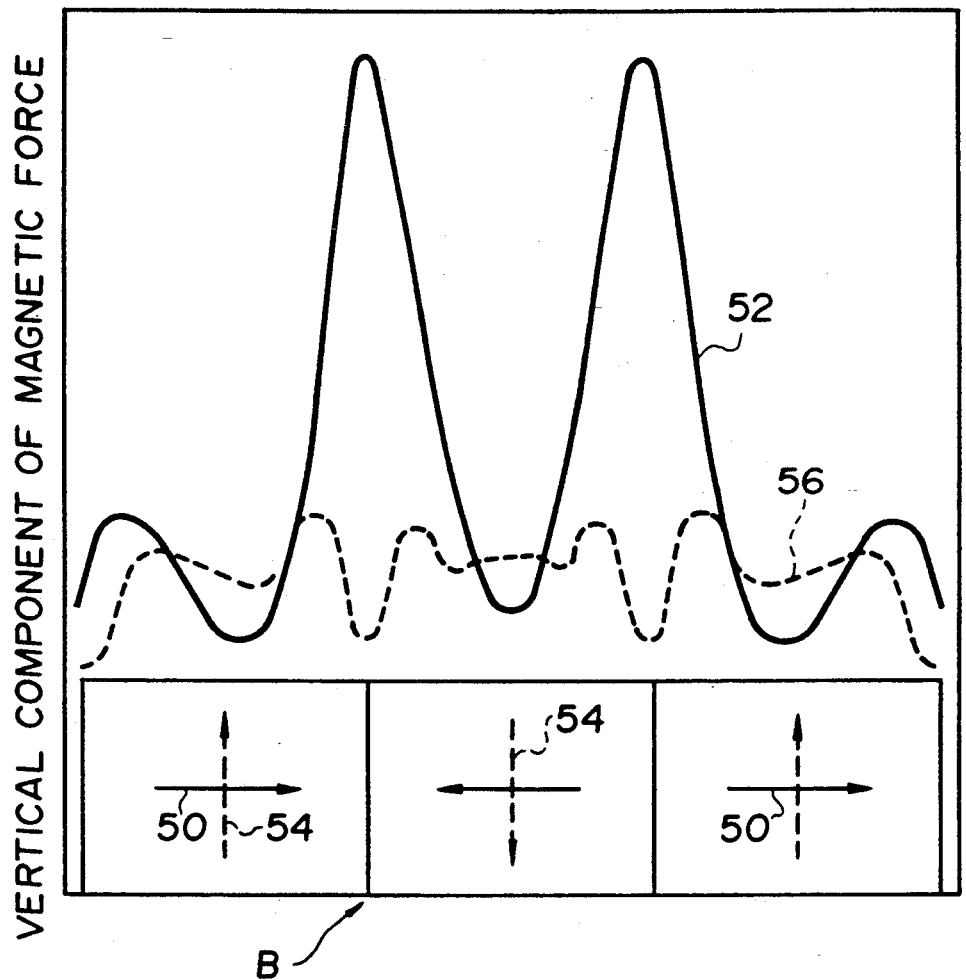
FIG. 2 is a diagram schematically illustrating the vertical components of magnetization orientations and magnetic forces on a magnetic recording medium.

Referring to FIG. 1, a preferred embodiment of a magnetic printer to which the present invention is applied includes a recording magnetic drum 1 which is driven to rotate in the direction indicated by the arrow A. The recording magnetic drum 1 includes a core body 12 which has its circumferential surface coated with a magnetic recording medium 13, on which a magnetic latent image is to be formed and which will be described in detail later. The printer also includes an eraser 2 which magnetizes part of the magnetic recording medium 13 thereunder in a predetermined magnetic orientation while the drum 1 rotates at a predetermined angular rate in the direction A. The printer also comprises a magnetic recording transducer or head 3 which is provided in opposition to the surface 20 of the drum 1 and adapted to receive an image signal and form magnetically a latent image in the recording medium 13 in response to the image signal.

The magnetic printer is also provided with a developer unit 4 which is adapted to supply the circumferential surface 20 of the magnetic recording medium 13 with magnetic toners to develop the magnetic latent image, thus formed on the surface 20 of the recording medium 13, into a visible image. The printer additionally includes a transfer unit 5 which is adapted to transfer toners thus forming the visible image onto a sheet of paper 22, which is fed to part of the surface 20 of the medium 12. Along the path on which a sheet of paper 22 is transferred in the direction designated by another arrow C, there is a fixing unit 6 adapted to thermally fix the toners transferred on the sheet of paper 20. A cleaning device 7 is provided in the vicinity of part of the surface 20 of the magnetic recording medium 13 to remove remaining toners from that part of the surface 20, for the purpose of further use in a following printing.

Figure 3:
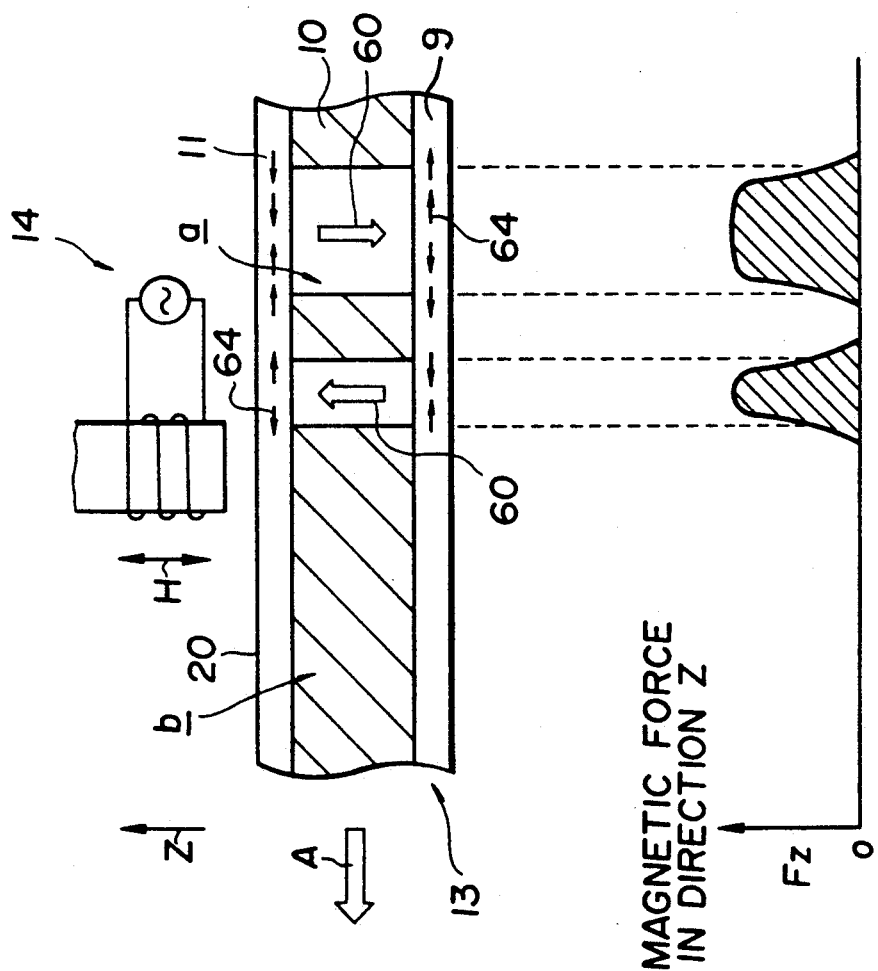
FIG. 3 is a diagram useful for understanding an erasing process in a recording method using a magnetic recording medium according to the present invention.
Figure 4:
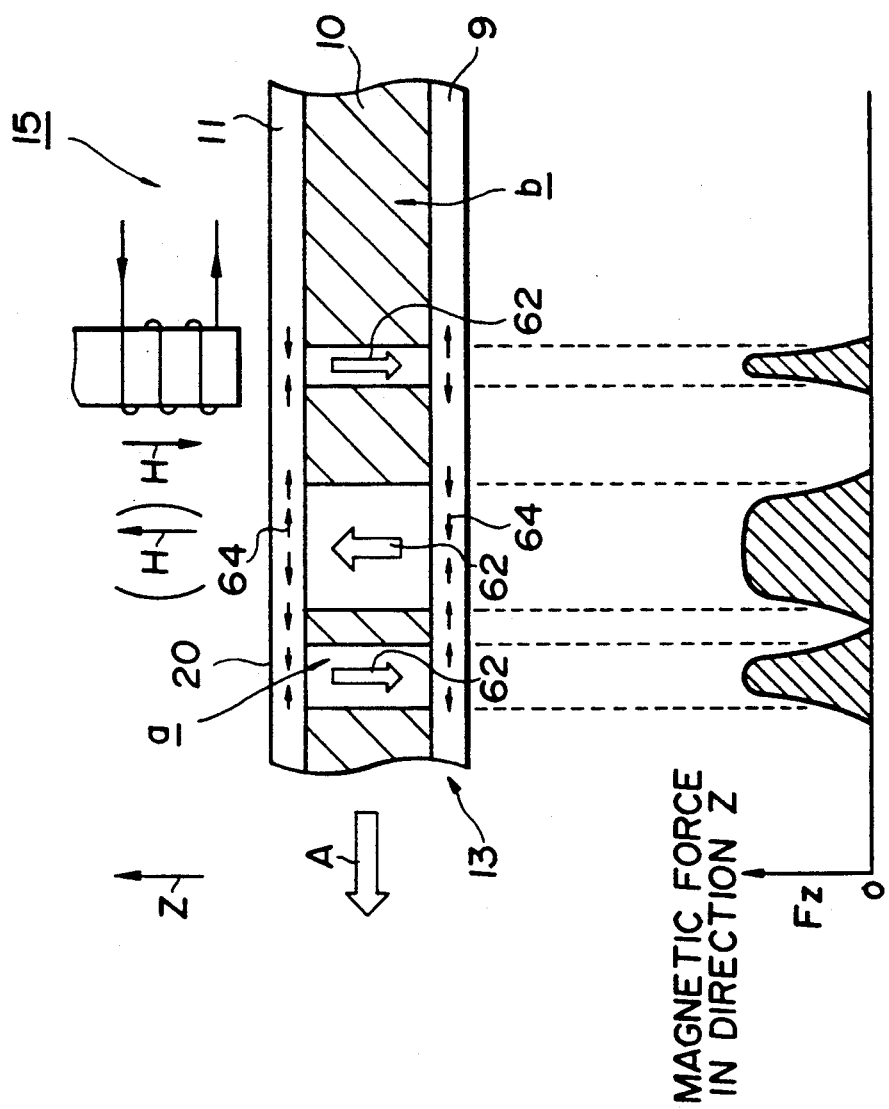
FIG. 4 is a diagram, similar to FIG. 3, useful for understanding a recording process in a recording method using a magnetic recording medium according to the present invention.
Figure 5A:
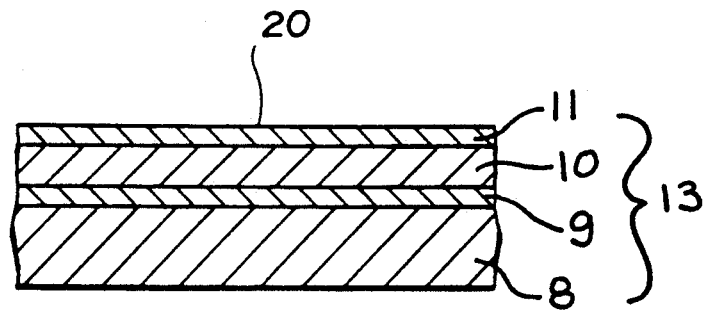
FIGS. 5A and 5B are schematic, cross sectional views showing a structure of a magnetic recording medium included in the embodiment shown in FIG. 1.
Figure 5B:
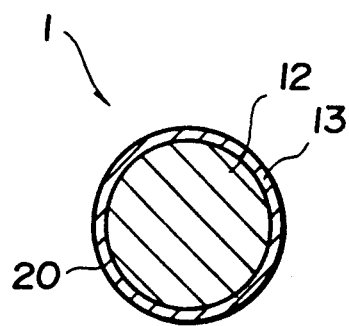

FIG. 3 shows schematically how to erase a recording in a magnetic recording medium of the present invention, and FIG. 4 slso schematicaly shows how to record the magnetic recording medium of the present invention. FIGS. 5A and 5B show a magnetic recording medium of the present invention, FIG. 5A showing an enlarged cross section of part of the magnetic recording medium of a preferred embodiment of the present invention, FIG. 5B being also a general view showing a cross section of a magnetic drum formed with the recording medium. In FIGS. 5A and 5B, the magnetic recording medium 13 comprises three laminating layers piled up on a freely bendable stainless steel substrate 8 which may be tens to hundreds micrometers thick. The substrate 8 is laminated with a first layer or a soft-magnetic thin film layer 9 of a high permeability whose magnetic coercivity is equal to or less than 1.0 Oe. On the thin film layer 9, formed is a second layer or a vertical magnetization film 10, which is laminated with a third layer or a soft-magnetic thin film layer 11 of a high permeability. The entire structure of the magnetic recording medium 13 is generally formed in a sheet, and is wound on a magnetic drum core material 12 as seen in FIG. 5B.

In FIGS. 3 and 4, there are schematically depicted the soft-magnetic thin film layer of the first layer 9, the vertical magnetization film of the second layer 10, and the soft-magnetic thin film layer of the third layer 11. Thermal magnetic heads 14 and 15 for erasing and recording, respectively, are disposed in such a manner that they face the laminating, layered structure designated by the reference numerals 9, 10 and 11. In these figures, reference letters a and b designate recorded and erased portions of the layered structure, respectively. The recording medium 13 runs in the direction A as the drum 1 rotates. Magnetic orientations or magnetization directions are indicated by fat or bold arrows 60 and 62 in the second layer 10, in FIGS. 3 and 4. In addition, magnetization directions in the first and third layers 9 and 10 are shown by thin arrows 64.

Recording is carried out in the magnetic recording apparatus of the present invention by the following processes. First, erasing process is performed as shown in FIG. 3 by using an alternate current erasing scheme. Then, recording process is carried out as shown in FIG. 4 so that an intended magnetic latent image is formed. Thereafter, magnetic toners are supplied onto the surface 20, of the recording medium 13 to be attracted thereon by magnetic force $F_z$ produced between the magnetic recording medium 13 and the magnetic toners.

In the recording process, the magnetized directions in the recording areas a are alternately reversed as shown by the fat arrows 62 in FIG. 4 so that the soft-magnetic thin films 9 and 11 forming the first and third layers, respectively, serve to improve the recording efficiency, enabling low power consumption recording. In addition, the vertical magnetization film 10 forming the second layer produces magnetic field which induces magnetization 64 in the soft-magnetic thin film layer 11 forming the third layer in the longitudinal direction along the surface 20 of the magnetic recording medium 13. The longitudinal magnetization includes magnetic domains in which the magnetization reverses alternately in direction, as shown by thin arrows 64, and the magnetic flux is concentrated, and hence, the magnetic force Fz increases, thus enabling high density recording.

Results of a magnetic recording carried out by using the magnetic recording apparatus and the magnetic recording medium described above will be described. In this recording experiment, Cu-Mo Permalloy thin films were used as the first and third layers, namely, the soft magnetic thin films 9 and 11. In addition, a Co/Pt artificial superlattice or a Co/Pd artificial superlattice, which had been subjected to heat treatment at 300° C. in the air for 30 minutes after formed, was used as the second layer or the vertical magnetization film 10. The magnetic recording medium 13 was formed by using sputtering process in which Cu-Mo permalloy (11Fe, 72Ni, 14Cu, 3Mo (wt %)) was used as a target to form the Cu-Mo permalloy film. The artificial superlattice was formed by the sputtering process also with Co and Pt, or Co and Pd employed as targets while rotating the stainless steel substrate 8.

The Co layer and Pt layer constituting the Co/Pt artificial superlattice, or the Co layer and Pd layer constituting the Co/Pd artificial superlattice, used for the second layer or the vertical magnetization film 10, had thickness $d_{Co}$ of 5 angstroms, $d_{Pt}$ of 17 angstroms and $d_{Pd}$ of 17 angstroms, respectively. In addition, the first, second, and third layers, that is, the soft magnetic thin film 9, the vertical magnetization film 10, and the soft magnetic thin film 11, had thicknesses of $d_1 = 1.0$ micrometer, $d_2 = 1.0$ micrometer and $d_3 = 300$ angstroms, respectively. Evaluation of the magnetic recording medium 13 used as a recording magnetic drum of a magnetic printer confirmed that the resolution greater than 100 lines/mm could be achieved.

Next, recording was performed on the magnetic recording medium 13 by using the thermal magnetic recording head, and results evaluated on the magnetic characteristics obtained by this recording experiment will be described. The magnetic characteristics of the magnetic recording medium 13 were evaluated in terms of recording sensitivity Srec and reproduction sensitivity Srep. The recording sensitivity Srec was defined as the reciprocal of a recording current value required to obtain the 90% level of the saturated reproduction output, and the reproduction sensitivity was defined as a reproduction voltage. The recording density was 400 DPI (dots per inch) throughout the experiment.

Figure 6:
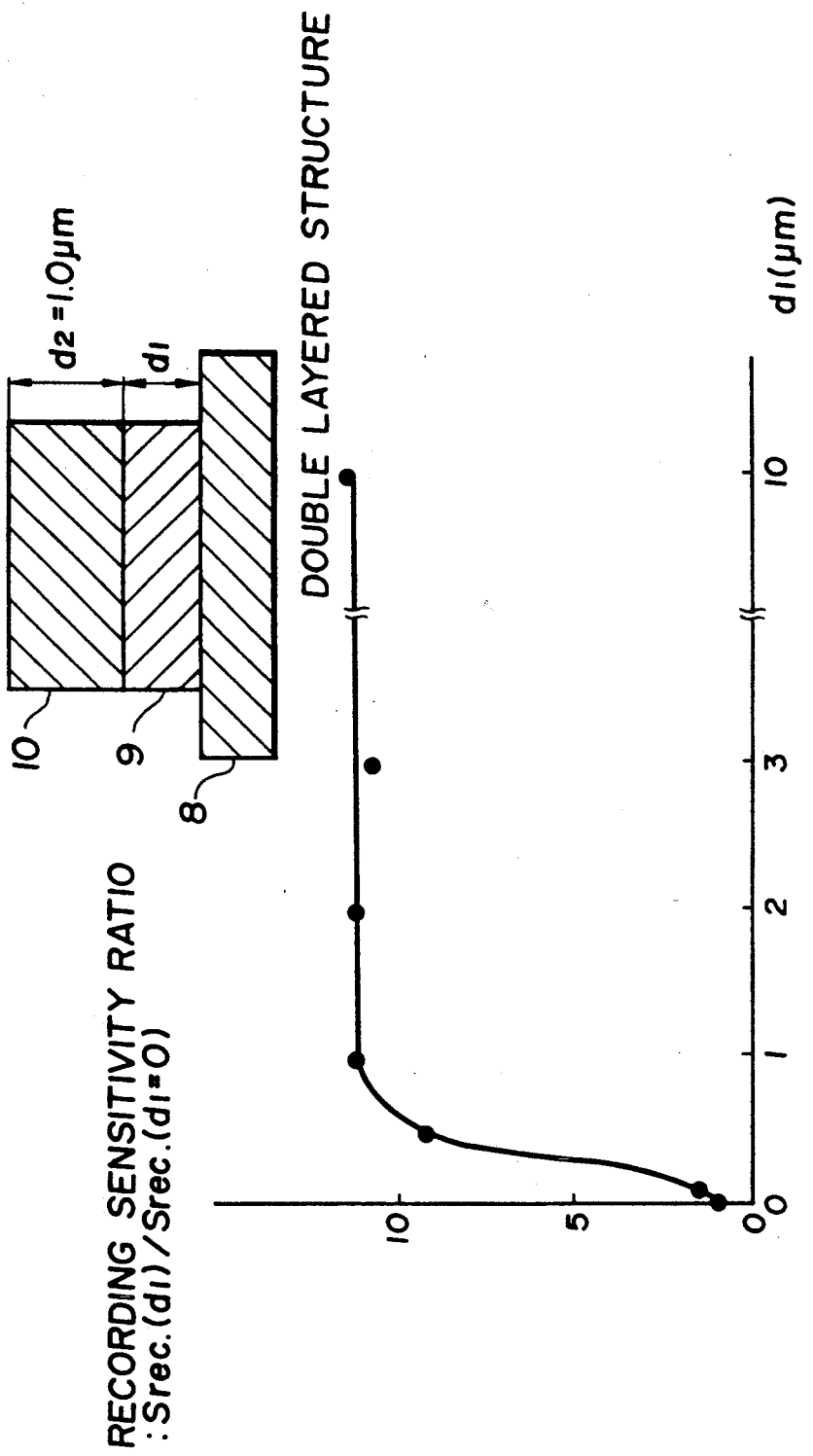
FIG. 6 plots exemplarily a recording sensitivity characteristic of a double layered structure of magnetic recording medium with a schematic illustration of the double layered structure.
Figure 7:
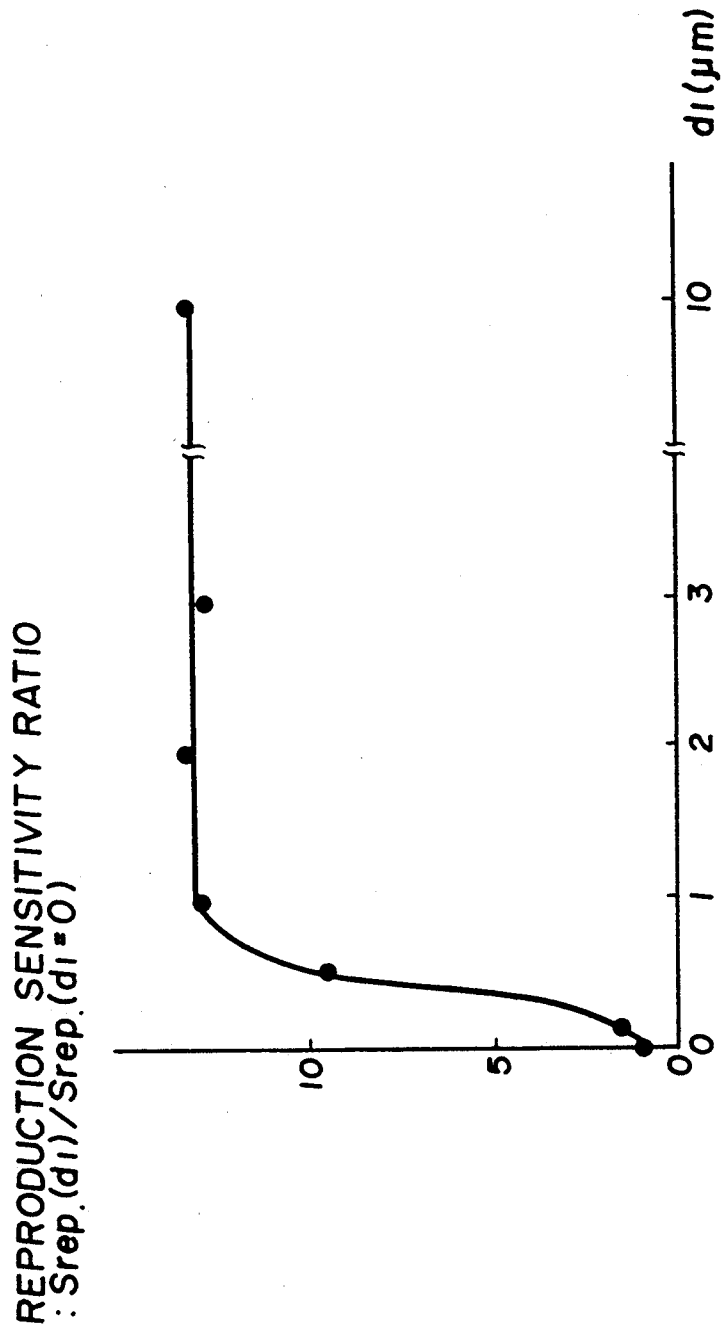
FIG. 7 plots exemplarily a reproduction sensitivity characteristic of the double layered structure magnetic recording medium.
Figure 8:
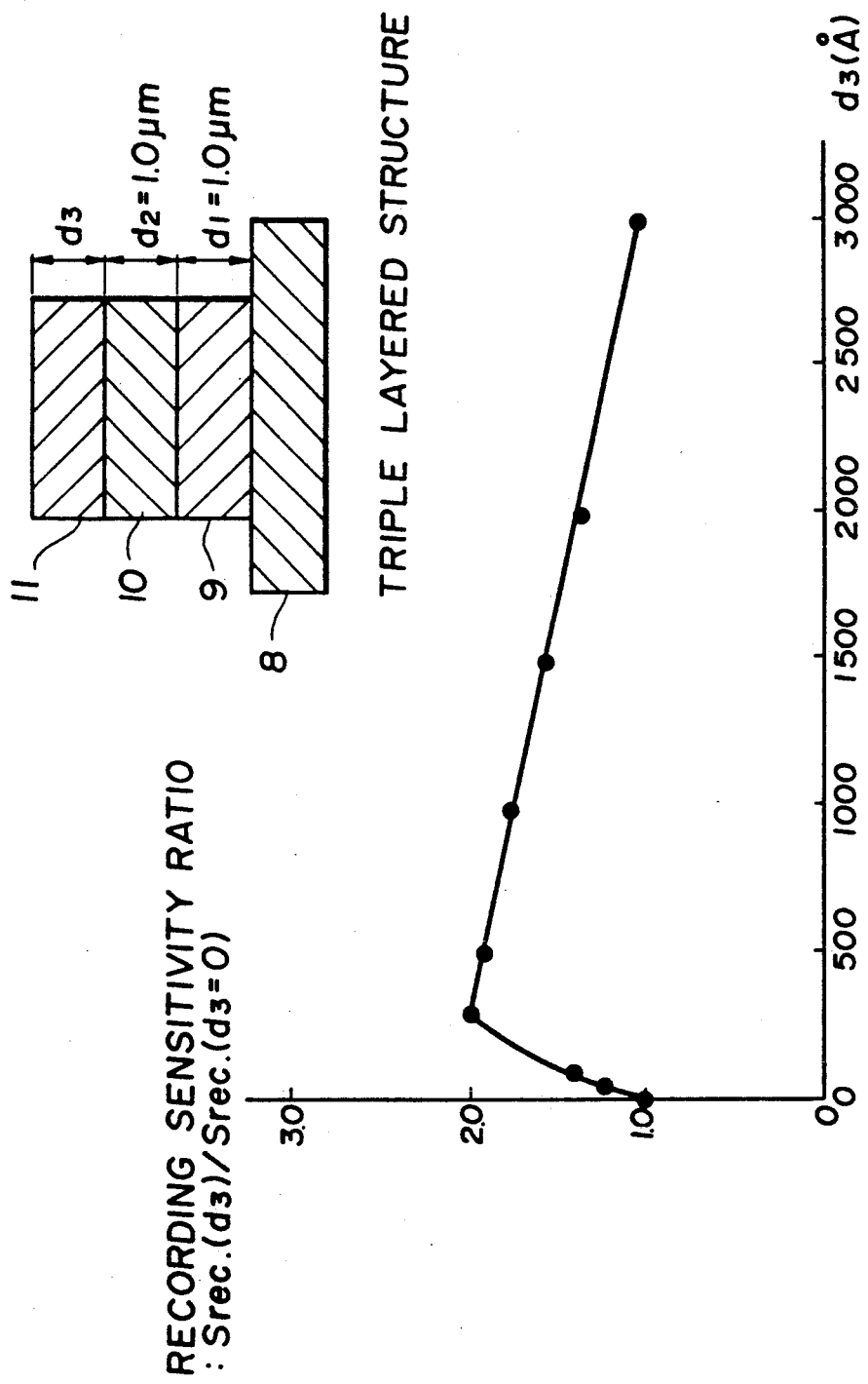
FIG. 8 plots, similarly to FIG. 6, an example of a recording sensitivity characteristic of an embodiment of a magnetic recording medium according to the present invention with a schematic illustration of the triple layered structure of magnetic recording medium.
Figure 9:
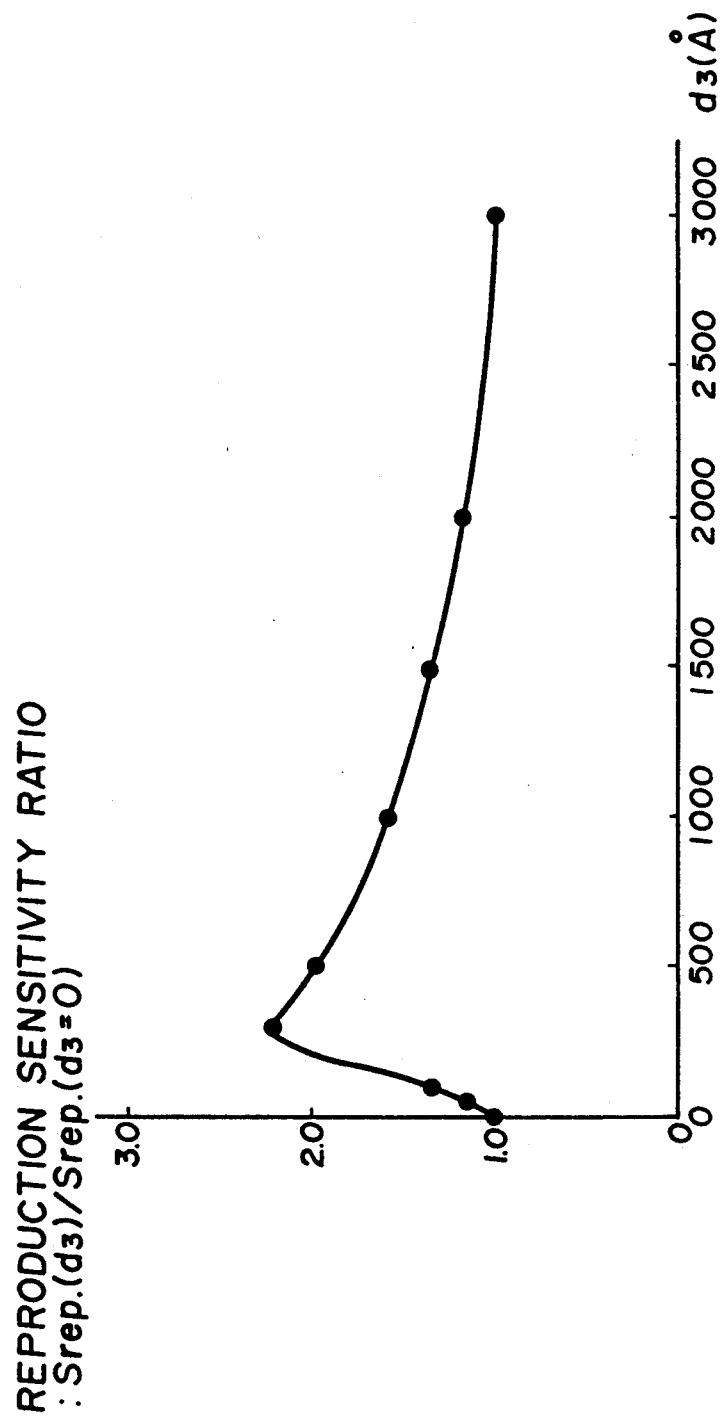
FIG. 9 plots, similarlly to FIG. 7, an example of a reproduction sensitivity characteristic of the embodiment of a magnetic recording medium.
Figure 10:
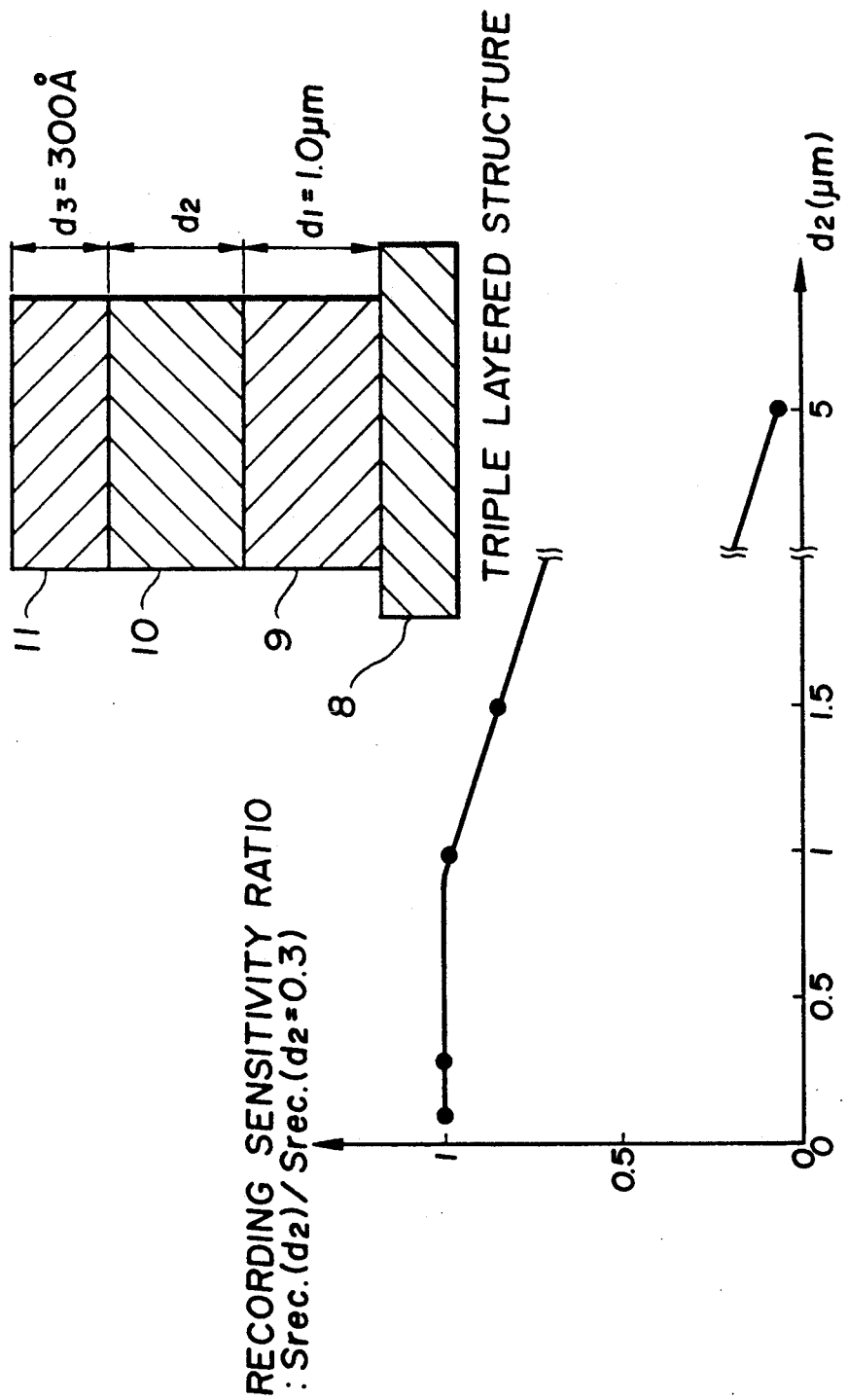
FIG. 10 plots, similarly to FIG. 6, an example of a recording sensitivity characteristic of an alternative embodiment of a magnetic recording medium according to the present invention having triple layered structure with the structure schematically illustrated.
Figure 11:
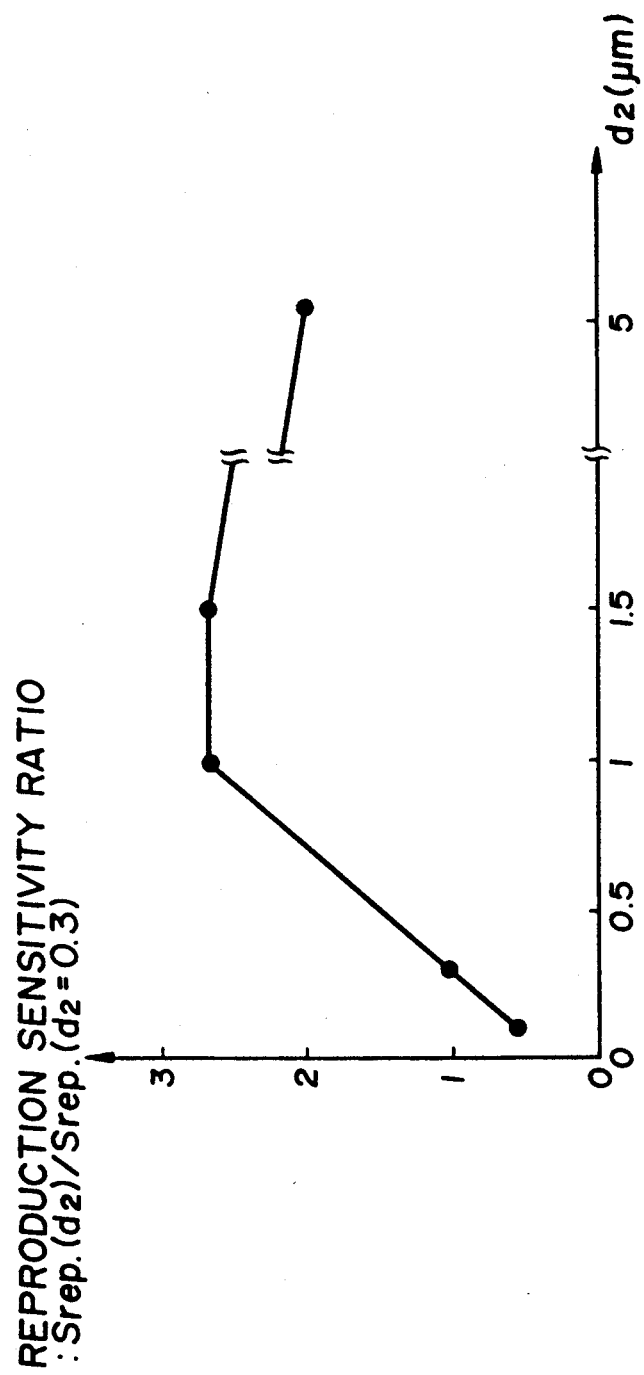
FIG. 11 plots, similarly to FIG. 7, an example of a reproduction sensitivity characteristic of the alternative embodiment of the triple layered structure of the magnetic recording medium.

FIG. 6 is a diagram in which plotted are recording sensitivity characteristics of a double layered structure of magnetic recording medium, and FIG. 7 is a diagram in which plotted are reproduction sensitivity characteristics of a double layered structure of magnetic recording medium. FIG. 8 plots recording sensitivity characteristics of a magnetic recording medium according to a first embodiment, and FIG. 9 plots reproduction sensitivity characteristics of the magnetic recording medium according to the first embodiment. In addition, FIG. 10 is also a diagram which plots recording sensitivity characteristics of a triple layered structure of magnetic recording medium according to a second embodiment, and FIG. 11 shows reproduction sensitivity characteristics of the triple layered structure of magnetic recording medium according to the second embodiment.

In FIG. 6, it is assumed that the thickness $d_2$ of the second layer or the vertical magnetization film 10 is 1.0 micrometer ($\mu$m), that the recording sensitivity Srec when the thickness $d_1$ of the first layer or the soft magnetic thin film 9 is varied is defined as Srec($d_1$), and that the recording sensitivity Srec when the thickness $d_2$ of the second layer or the vertical magnetization film 10 is 1.0 micrometer, and the thickness $d_1$ of the first layer or the soft magnetic thin film 9 is 0 micrometer is defined as $Srec(d_1=0)$. The ratio $Srec(d_1)/Srec(d_1=0)$ of the two recording sensitivities is plotted with respect to the thickness $d_1$.

Likewise, in FIG. 7, it is assumed that the thickness $d_2$ of the second layer or the vertical magnetization film 10 is 1.0 micrometer, that the reproduction sensitivity Srep when the thickness $d_1$ of the first layer or the soft magnetic thin film 9 is varied is defined as $Srep(d_1)$, and that the reproduction sensitivity Srep when the thickness $d_2$ of the second layer or the vertical magnetization film 10 is 1.0 micrometer, and the thickness $d_1$ of the first layer of the soft magnetic thin film 9 is 0 micrometer is defined as $Srep(d_1=0)$, and the ratio $Srep(d_1)/Srep(d_1=0)$ of the two reproduction sensitivities is also plotted with respect to the thickness $d_1$.

As shown in those figures, the recording sensitivity Srec and the reproduction sensitivity Srep are both increased by nearly one order of magnitude when the thickness $d_1$ of the first layer or the soft magnetic thin film layer 9 used as a backing layer exceeds 0.5 micrometer. The thickness of a substrate layer is advantageously as thin as possible to realize a high recording speed. Therefore, the thickness $d_1$ of the first layer or the soft magnetic thin film 9 is preferably equal to or less than 10 micrometers.

Next, the triple layered structure of the magnetic recording medium of the first embodiment will be described. In FIG. 8, it is assumed that the thickness $d_1$ of the first layer or the soft magnetic thin film 9 and the thickness $d_2$ of the second layer or the vertical magnetization film 10 are 1.0 micrometer, that the recording sensitivity Srec when the thickness $d_3$ of the third layer or the soft magnetic thin film 11 is varied is defined as $Srec(d_3)$, and that the recording sensitivity Srec when the thickness $d_1$ of the first layer or the soft magnetic thin film 9 and the thickness $d_2$ of the second layer or the vertical magnetization film 10 are made 1.0 micrometer, and the thickness $d_3$ of the third layer or the soft magnetic thin film 11 is made 0 micrometer is defined as $Srec(d_3=0)$. The ratio $Srec(d_3)/Srec(d_3=0)$ of the two recording sensitivities is shown with respect to the thickness $d_3$.

Likewise, in FIG. 9, it is assumed that the thickness $d_1$ of the first layer or the soft magnetic thin film 9 and the thickness $d_2$ of the second layer or the vertical magnetization film 10 are 1.0 micrometer, that the reproduction sensitivity Srep when the thickness $d_3$ of the third layer or the soft magnetic thin film 11 is varied is defined as $Srep(d_3)$, and that the reproduction sensitivity Srep when the thickness $d_1$ of the first layer or the soft magnetic thin film 9 and the thickness $d_2$ of the second layer or the vertical magnetization film 10 are made 1.0 micrometer, and the thickness $d_3$ of the third layer or the soft magnetic thin film 11 is made 0 micrometer is defined as $Srep(d_3=0)$. The ratio $Srep(d_3)/Srep(d_3=0)$ of the two reproduction sensitivities is plotted with respect to the thickness $d_3$.

As shown in those figures, the recording sensitivity Srec is nearly doubled when the thickness $d_3$ of the third layer or the soft magnetic thin film 11 exceeds 300 angstroms. Similarly, the reproduction sensitivity Srep is increased about 2.5 times when the thickness $d_3$ of the third layer or the soft magnetic thin film 11 is 300 angstroms at which the reproduction sensitivity Srep takes a maximum value. Further increase in the thickness $d_3$ tends to decrease both recording sensitivity Srec and reproduction sensitivity Srep. The reason for this is thought that the third layer of the soft magnetic thin film 11 hinders the second layer or the vertical magnetization film 10 from changing its magnetization.

Next, the triple layered structure of the magnetic recording medium of the second embodiment will be described. In FIG. 10, it is assumed that the thickness $d_1$ of the first layer or the soft magnetic thin film 9 is 1 micrometer, and the thickness $d_3$ of the third layer or the soft magnetic thin film 11 is 300 angstroms, that the recording sensitivity Srec when the thickness $d_2$ of the second layer or the vertical magnetization film 10 is varied is defined as $Srec(d_2)$, and that the recording sensitivity Srec when the thickness $d_1$ of the first layer or the soft magnetic thin film 9 is made 1.0 micrometer and the thickness $d_3$ of the third layer or the soft magnetic thin film 11 is made 300 angstroms, and the thickness $d_2$ of the second layer or the vertical magnetization film 10 is made 0.3 micrometer is defined as $Srec(d_2=0.3)$. The ratio $Srec(d_2)/Srec(d_20.3)$ of the two recording sensitivities is plotted with respect to the thickness $d_2$.

Likewise, in FIG. 11, it is assumed that the thickness $d_1$ of the first layer or the soft magnetic thin film 9 is 1 micrometer, and the thickness $d_5$ of the third layer or the soft magnetic thin film 11 is 300 angstroms, that the reproduction sensitivity Srep when the thickness $d_2$ of the second layer or the vertical magnetization film 10 is varied is defined as $Srep(d_2)$, and that the reproduction sensitivity Srep when the thickness $d_1$ of the first layer or the soft magnetic thin film 9 is made 1.0 micrometer and the thickness $d_3$ of the third layer or the soft magnetic thin film 11 is made 300 angstroms, and the thickness $d_2$ of the second layer or the vertical magnetization film 10 is made 0.3 micrometer is defined as $Srep(d_2=0.3)$. The ratio $Srep(d_2)/Srep(d_2=0.3)$ of the two reproduction sensitivities is plotted with respect to the thickness $d_2$.

As seen from those figures, the reproduction sensitivity Srep declines when the thickness $d_2$ of the second layer or the vertical magnetization film 10 is less than 0.3 micrometer so that sufficient magnetic force cannot be obtained to attract magnetic toners. The recording sensitivity Srec and the reproduction sensitivity Srep both decline when the thickness $d_2$ exceeds 5 micrometers because the first layer or the soft magnetic thin film 9 as a backing layer reduces its effect. This not only reduces the recording sensitivity, but also makes high-speed recording impossible, and further, increases power consumption.

Next, a magnetic recording medium of a third embodiment of the present invention will be described. In this experiment, a Cu-Mo permalloy thin film was used as a first layer, namely, a soft magnetic thin film 9 shown in FIG. 5. In addition, a Co/Pt artificial superlattice or a Co/Pd artificial superlattice, which had been subjected to heat treatment at 300° C. in the air for 30 minutes after formed, was used as a second layer or a vertical magnetization film 10. As a third layer or a soft magnetic thin film 11, an iron nitride thin film was employed.

A magnetic recording medium 13 was formed by using sputtering process in which Cu-Mo permalloy (11Fe, 72Ni, 14Cu, 3Mo (wt %)) was used as a target to form the Cu-Mo permalloy film. The artificial superlattice was formed in the sputtering process with Co and Pt, or Co and Pd employed as targets while rotating a stainless steel substrate 8.

A Co layer and Pt layer constituting the Co/Pt artificial superlattice, or the Co layer and Pd layer constituting the Co/Pd artificial superlattice, as the second layer or the vertical magnetization film 10, had thickness $d_{Co}$ of 5 angstroms, $d_{Pt}$ of 17 angstroms and $d_{Pd}$ of 17 angstroms, respectively. In addition, the iron nitride thin film functioning as the third layer or the soft magnetic thin film 11 was formed by sputtering the Fe target with $(Ar+N_2)$ mixture gas. In this case, the total gas pressure was made 3.0 mTorr, and the partial pressure of the $N_2$ gas was made 0.1-1.0 mTorr.

The first, second, and third layers, that is, the soft magnetic thin film 9, the vertical magnetization film 10, and the soft magnetic thin film 11, had thicknesses of $d_1=1.0$ micrometer, $d_2=1.0$ micrometer and $d_3=300$ angstroms, respectively. Evaluation of the magnetic recording medium 13 used as a recording magnetic drum of a magnetic printer confirmed that the resolution greater than 100 lines/mm could be achieved.

Figure 12:
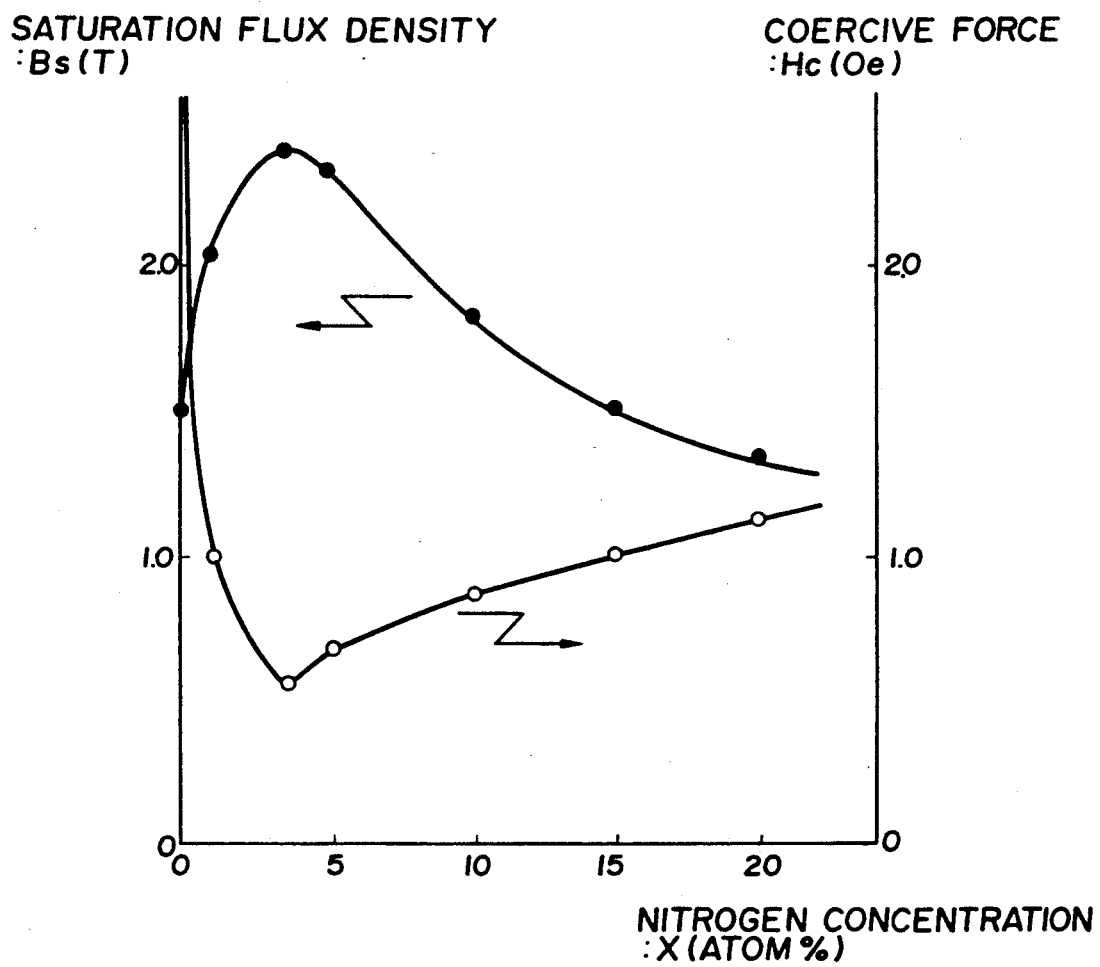
FIG. 12 is a diagram illustrating the relationships between nitrogen concentration, and saturation flux density and coercive force.

Next, relationships between the nitrogen concentration in the iron nitride thin film and the saturation flux density Bs and coercive force Hc will be described. FIG. 12 illustrates relationships between the nitrogen concentration in the iron nitride thin film and the saturation flux density Bs and coercive force Hc. From that figure, it is found that good soft magnetic characteristics can be obtained when the nitrogen concentration X (atom %) is in the range from 1 to 15 inclusive. The saturation flux density Bs and the coercive force Hc take their best values in the soft magnetic characteristics when the nitrogen concentration $X=3.5$ (atom %). The magnetic characteristics of the magnetic recording medium 13 were evaluated by using $Fe_{96.5}N_{3.5}$ as the iron nitride thin film, and a unipolar, thin-film magnetic head as a magnetic head. The evaluation was carried out in terms of recording sensitivity Srec and reproduction sensitivity Srep. The recording sensitivity Srec was defined as the reciprocal of a recording current value required to obtain the 90% level of the saturated reproduction output, and the reproduction sensitivity was defined as a reproduction voltage.

Figure 13:
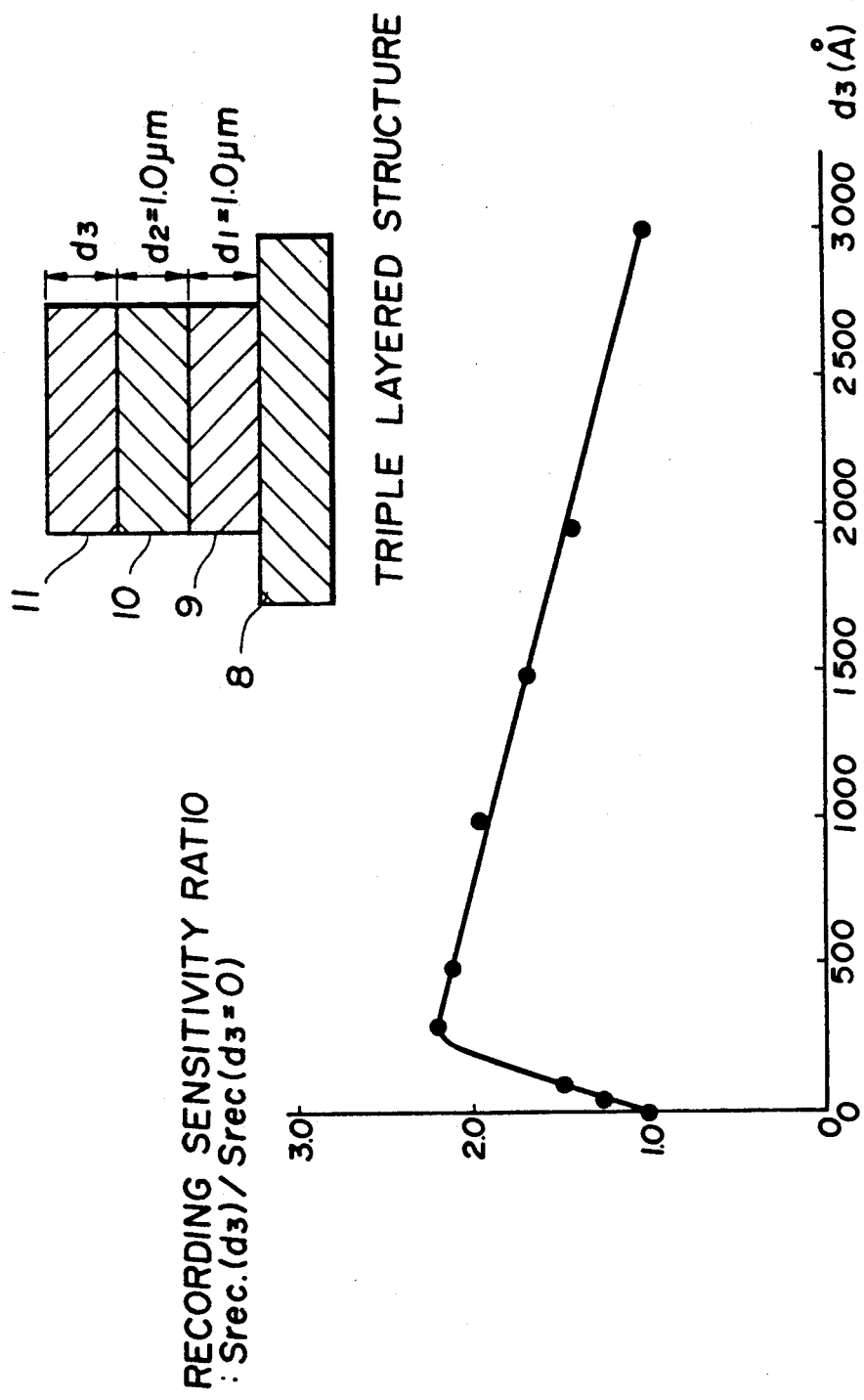
FIG. 13 also plots, similarly to FIG. 7, an example of a recording sensitivity characteristic of a further alternative embodiment of a magnetic recording medium according to the present invention with a schematic veiw of triple layered structure of a recording medium.
Figure 14:
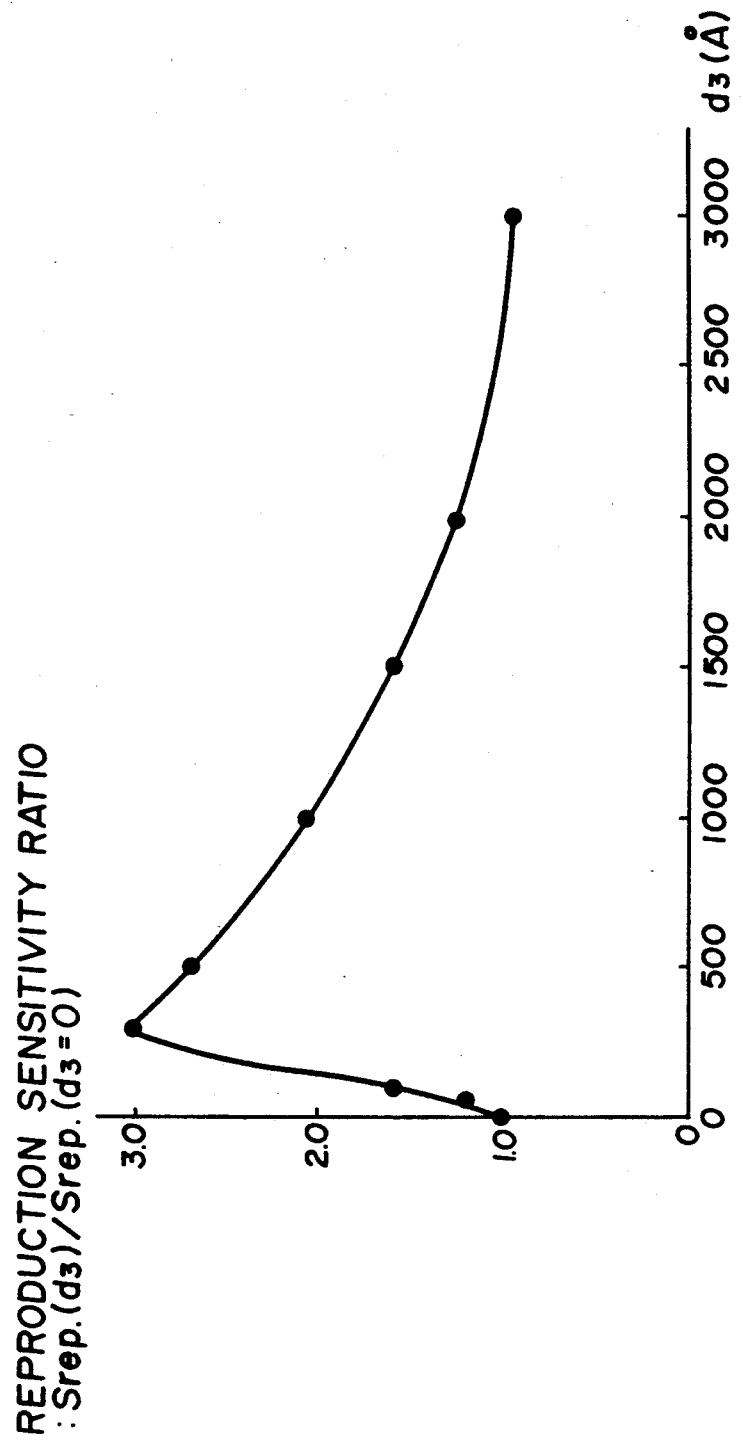
FIG. 14 plots, similarly to FIG. 7, an example of a reproduction sensitivity characteristic of the further alternative embodiment of a magnetic recording medium.

FIG. 13 plots recording sensitivity characteristics of a magnetic recording medium according to the third embodiment, and FIG. 14 does reproduction sensitivity characteristics of the magnetic recording medium according to the third embodiment. In FIG. 13, it is assumed that the thickness $d_1$ of the first layer or the soft magnetic thin film 9 and the thickness $d_2$ of the second layer or the vertical magnetization film 10 are 1.0 micrometer, that the recording sensitivity Srec when the thickness $d_3$ of the third layer or the soft magnetic thin film 11 is varied is defined as $Srec(d_3)$, and that the recording sensitivity Srec when the thickness $d_1$ of the first layer or the soft magnetic thin film 9 and the thickness $d_2$ of the second layer or the vertical magnetization film 10 are made 1.0 micrometer, and the thickness $d_3$ of the third layer or the soft magnetic thin film 11 is made 0 micrometer is defined as $Srec(d_3=0)$. The ratio $Srec(d_3)/Srec(d_3=0)$ of the two recording sensitivities is plotted with respect to the thickness $d_3$.

Likewise, in FIG. 14, it is assumed that the thickness $d_1$ of the first layer or the soft magnetic thin film 9 and the thickness $d_2$ of the second layer or the vertical magnetization film 10 are 1.0 micrometer, that the reproduction sensitivity Srep when the thickness $d_3$ of the third layer or the soft magnetic thin film 11 is varied is defined as $Srep(d_3)$, and that the reproduction sensitivity Srep when the thickness $d_1$ of the first layer or the soft magnetic thin film 9 and the thickness $d_2$ of the second layer or the vertical magnetization film 10 are made 1.0 micrometer, and the thickness $d_3$ of the third layer or the soft magnetic thin film 11 is made 0 m is defined as $Srep(d_3=0)$. The ratio $Srep(d_3)/Srep(d_3=0)$ of the two reproduction sensitivities is plotted with respect to the thickness $d_3$. Here, the saturation flux density Bs and the coercive force Hc of the iron nitride thin film was set as $Bs=2.2$ T and $Hc=0.5$ Oe, respectively.

As understood from in those figures, both the recording sensitivity Srec and the reproduction sensitivity Srep are enhanced. Both the recording sensitivity Srec and the reproduction sensitivity Srep take their maximum values when the thickness $d_3$ of the third layer or the soft magnetic thin film 11 made of iron nitride thin film is 300 angstroms. Further increase in the thickness $d_3$ tends to decline both recording sensitivity Srec and reproduction sensitivity Srep. The reason for this is thought that the third layer of the soft magnetic thin film 11 hinders the second layer or the vertical magnetization film 10 from its magnetization changes.

Figure 15:
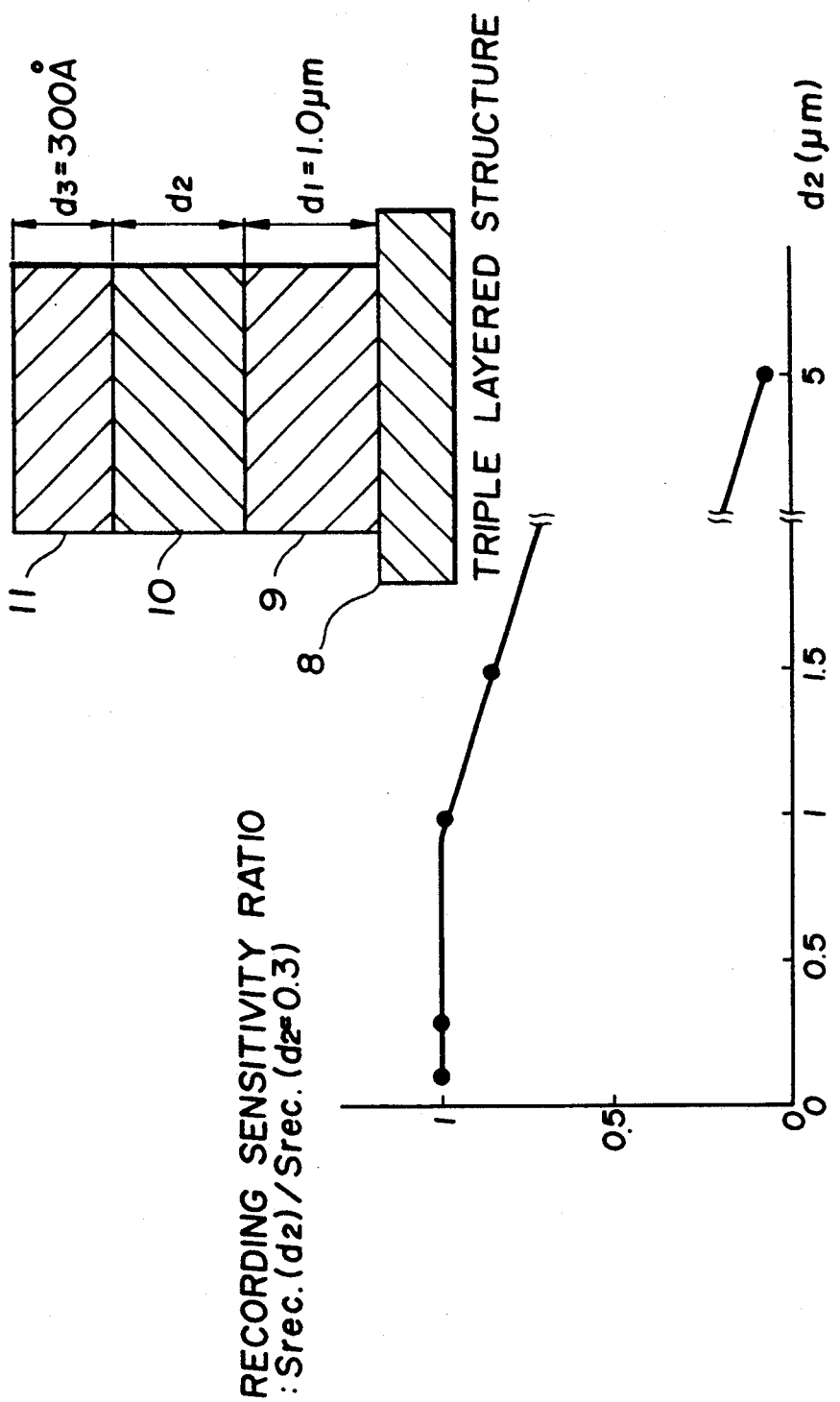
FIG. 15 plots, also similarly to FIG. 6, an example of a recording sensitivity characteristic of a still another alternative embodiment of a magnetic recording medium according to the present invention having triple layered structure with a schematic view of the triple layered structure.
Figure 16:
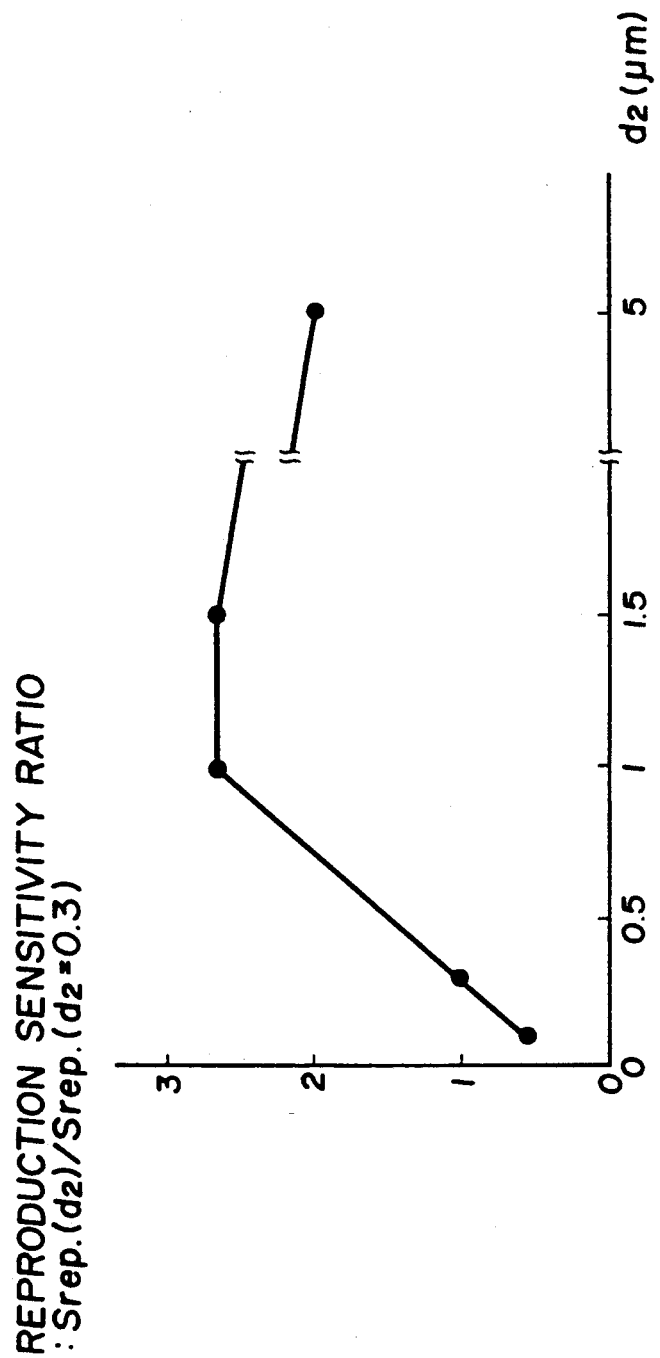
FIG. 16 plots, similarly to FIG. 7, an example of a reproduction sensitivity characteristic of the still alternative embodiment of the triple layered structure of the magnetic recording medium.

FIG. 15 illustrates recording sensitivity characteristics of a magnetic recording medium according to a fourth embodiment, and FIG. 16 plots reproduction sensitivity characteristics of the magnetic recording medium according to the fourth embodiment. In FIG. 15, it is assumed that the thickness $d_1$ of the first layer or the soft magnetic thin film 9 is 1.0 micrometer, and the thickness $d_3$ of the third layer or the soft magnetic thin film 11 is 300 angstroms, that the recording sensitivity Srec when the thickness $d_2$ of the second layer or the vertical magnetization film 10 is varied is defined as $Srec(d_2)$, and that the recording sensitivity Srec when the thickness $d_1$ of the first layer or the soft magnetic thin film 9 is made 1.0 micrometer and the thickness $d_3$ of the third layer or the soft magnetic thin film 11 is made 300 angstroms, and the thickness $d_2$ of the second layer or the vertical magnetization film 10 is made 0.3 micrometer is defined as $Srec(d_2=0.3)$. The ratio $Srec(d_2)/Srec(d_2=0.3)$ of the two recording sensitivities is plotted with respect to the thickness $d_2$.

Likewise, in FIG. 16, it is assumed that the thickness $d_1$ of the first layer or the soft magnetic thin film 9 is 1.0 micrometer, and the thickness $d_3$ of the third layer or the soft magnetic thin film 11 is 300 angstroms, that the reproduction sensitivity Srep when the thickness $d_2$ of the second layer or the vertical magnetization film 10 is varied is defined as $Srep(d_2)$, and that the reproduction sensitivity Srep when the thickness $d_1$ of the first layer or the soft magnetic thin film 9 is made 1.0 micrometer and the thickness $d_3$ of the third layer or the soft magnetic thin film 11 is made 300 angstroms, and the thickness $d_2$ of the second layer or the vertical magnetization film 10 is made 0.3 micrometer is defined as $Srep(d_2=0.3)$. The ratio $Srep(d_2)/Srep(d_2=0.3)$ of the two reproduction sensitivities is shown with respect to the thickness $d_2$.

As can be seen from those figures, the reproduction sensitivity Srep declines when the thickness $d_2$ of the second layer or the vertical magnetization film 10 is less than 0.1 micrometer so that sufficient magnetic force will not be obtained to attract magnetic toners. The recording sensitivity Srec and the reproduction sensitivity Srep both decline when the thickness $d_2$ exceeds 5 micrometer because the first layer or the soft magnetic thin film 9 as a backing layer reduces its effect. This not only reduces the recording sensitivity, but also makes high-speed recording impossible.

Figure 17:
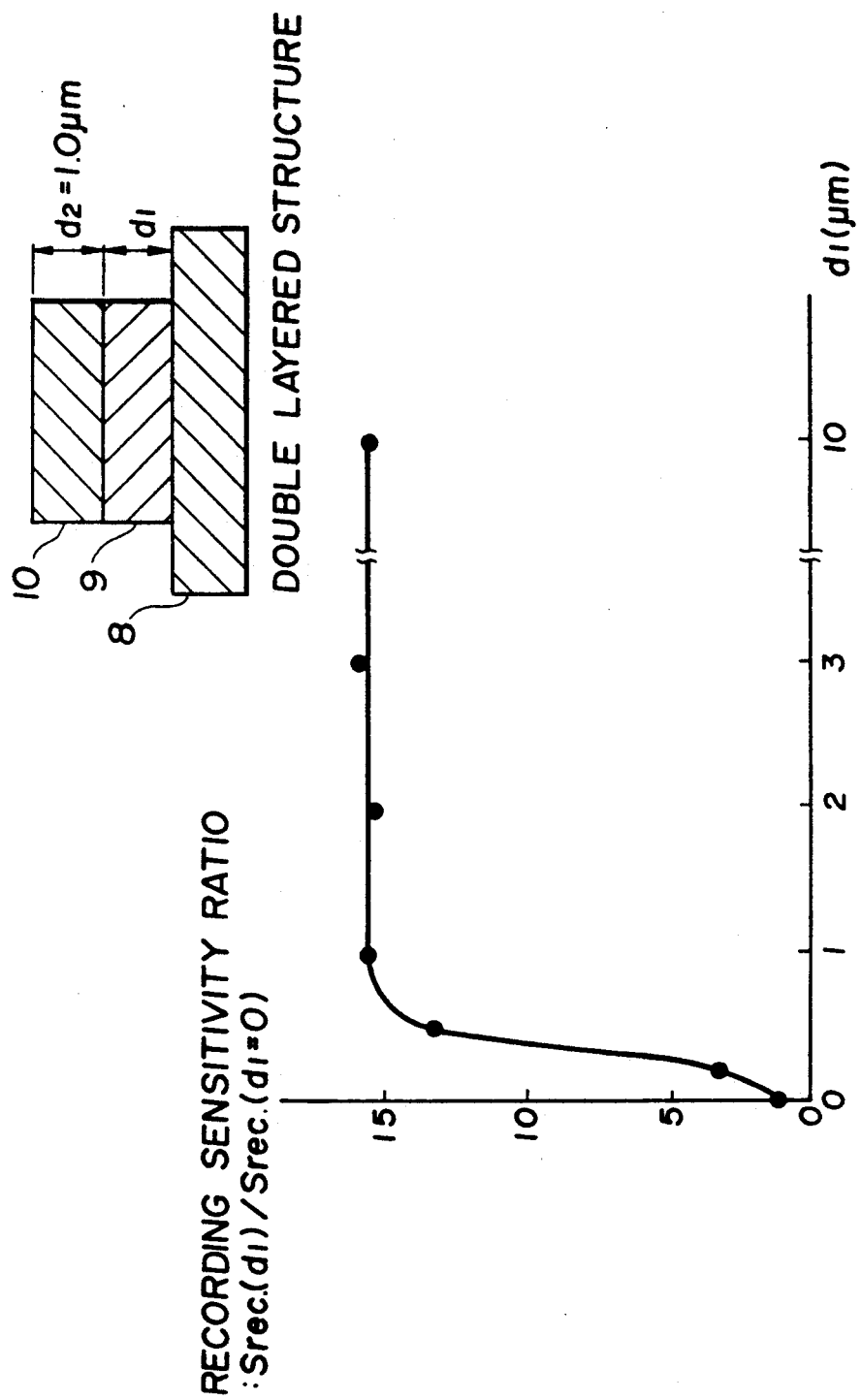
FIG. 17 plots, similarly to FIG. 6, an example of a recording sensitivity characteristic of a double layered structure of a magnetic recording medium using an iron nitride thin film according to the present invention with a double layered structure shown schematically.

Next, a magnetic recording medium as a fifth embodiment of the present invention is described. FIG. 17 illustrates recording sensitivity characteristics of a double layered structure of magnetic recording medium using an iron nitride thin film, FIG. 18 being a diagram illustrating reproduction sensitivity characteristics of the double layered structure of magnetic recording medium using the iron nitride thin film. FIG. 19 illustrates recording sensitivity characteristics of a magnetic recording medium according to the fifth embodiment, and FIG. 20 does reproduction sensitivity characteristics of the magnetic recording medium according to the fifth embodiment.

Figure 18:
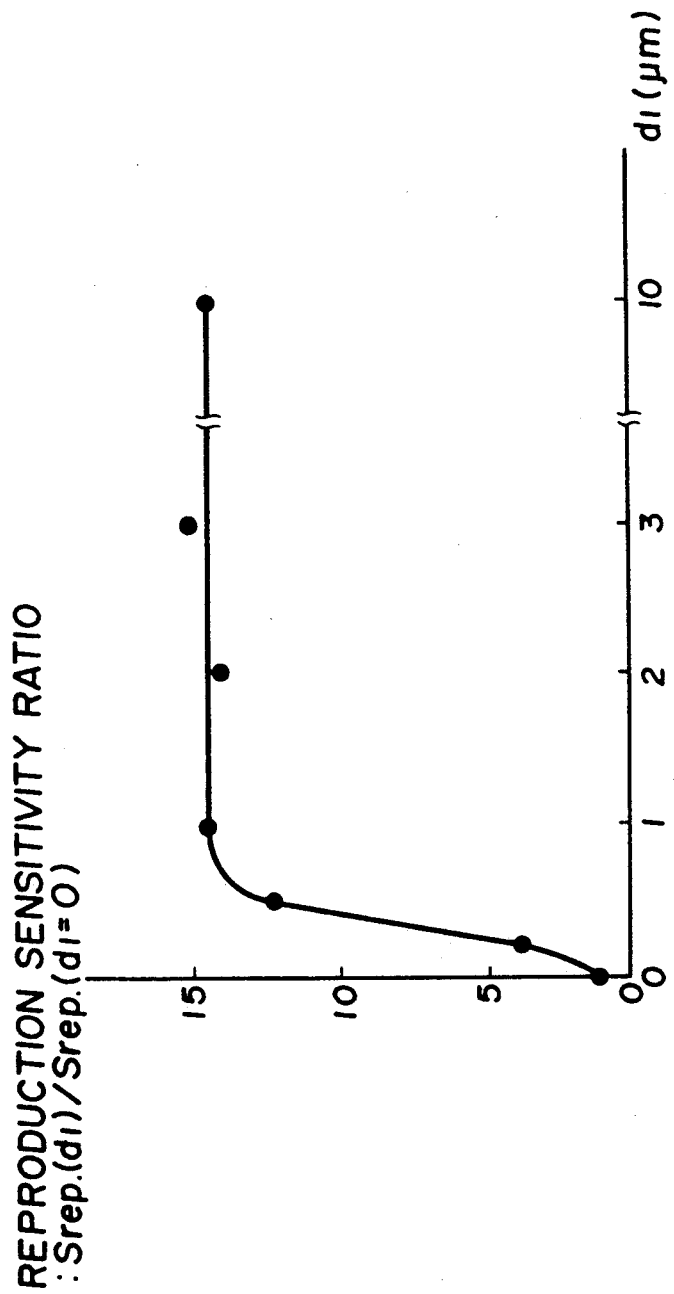
FIG. 18 plots, similarly to FIG. 7, an example of a reproduction sensitivity characteristic of the double layered structure of a magnetic recording medium using an iron nitride thin film with a schematic view of the double layered structure.
Figure 19:
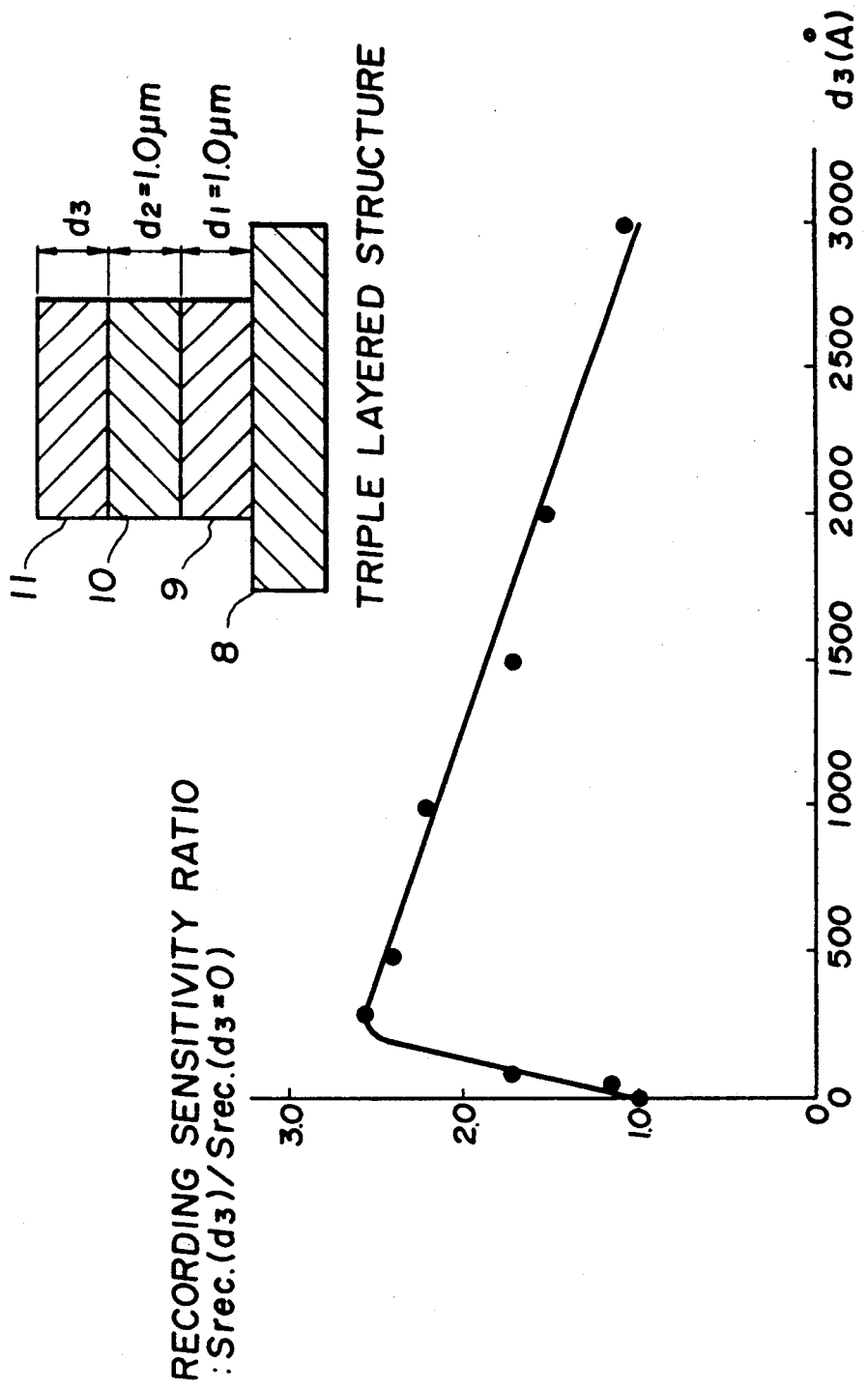
FIG. 19 also plots, similarly to FIG. 6, an example of a recording sensitivity characteristic of a still further alternative embodiment of a magnetic recording medium according to the present invention having triple layered structure with a schematic view of the structure.

In the magnetic recording medium shown in FIGS. 17 and 18, an iron nitride thin film was used as a first layer or a soft magnetic thin film 9, and a Co/Pt artificial superlattice or a Co/Pd artificial superlattice, which had been subjected to heat treatment at 300° C. in the air for 30 minutes after formed, was used as a second layer or a vertical magnetization film 10.

In FIG. 17, it is assumed that the thickness $d_2$ of the second layer or the vertical magnetization film 10 is 1.0 micrometer, that the recording sensitivity Srec when the thickness $d_1$ of the first layer or the soft magnetic thin film 9 is varied is defined as $Srec(d_1)$, and that the recording sensitivity Srec when the thickness $d_2$ of the second layer or the vertical magnetization film 10 is 1.0 micrometer, and the thickness $d_1$ of the first layer or the soft magnetic thin film 9 is 0 micrometer is defined as $Srec(d_1=0)$. The ratio $Srec(d_1)/Srec(d_1=0)$ of the two recording sensitivities is shown with respect to the thickness $d_1$.

Likewise, in FIG. 18, it is assumed that the thickness $d_2$ of the second layer or the vertical magnetization film 10 is 1.0 micrometer, that the reproduction sensitivity Srep when the thickness $d_1$ of the first layer or the soft magnetic thin film 9 is varied is defined as $Srep(d_1)$, and that the reproduction sensitivity Srep when the thickness $d_2$ of the second layer or the vertical magnetization film 10 is 1.0 micrometer, and the thickness $d_1$ of the first layer or the soft magnetic thin film 9 is 0 micrometer is defined as $Srep(d_1=0)$, the ratio $Srep(d_1)/Srep(d_1=0)$ of the two reproduction sensitivities being plotted with respect to the thickness $d_1$.

As shown in those figures, the recording sensitivity Srec and the reproduction sensitivity Srep are both increased by nearly one order of magnitude when the thickness $d_1$ of the first layer or the soft magnetic thin film layer 9 as a backing layer exceeds 0.5 micrometer. In this case, a greater recording sensitivity Srec can be obtained than in the case where a Cu-Mo permalloy thin film is used as the first layer or the soft magnetic thin film 9.

Figure 20:
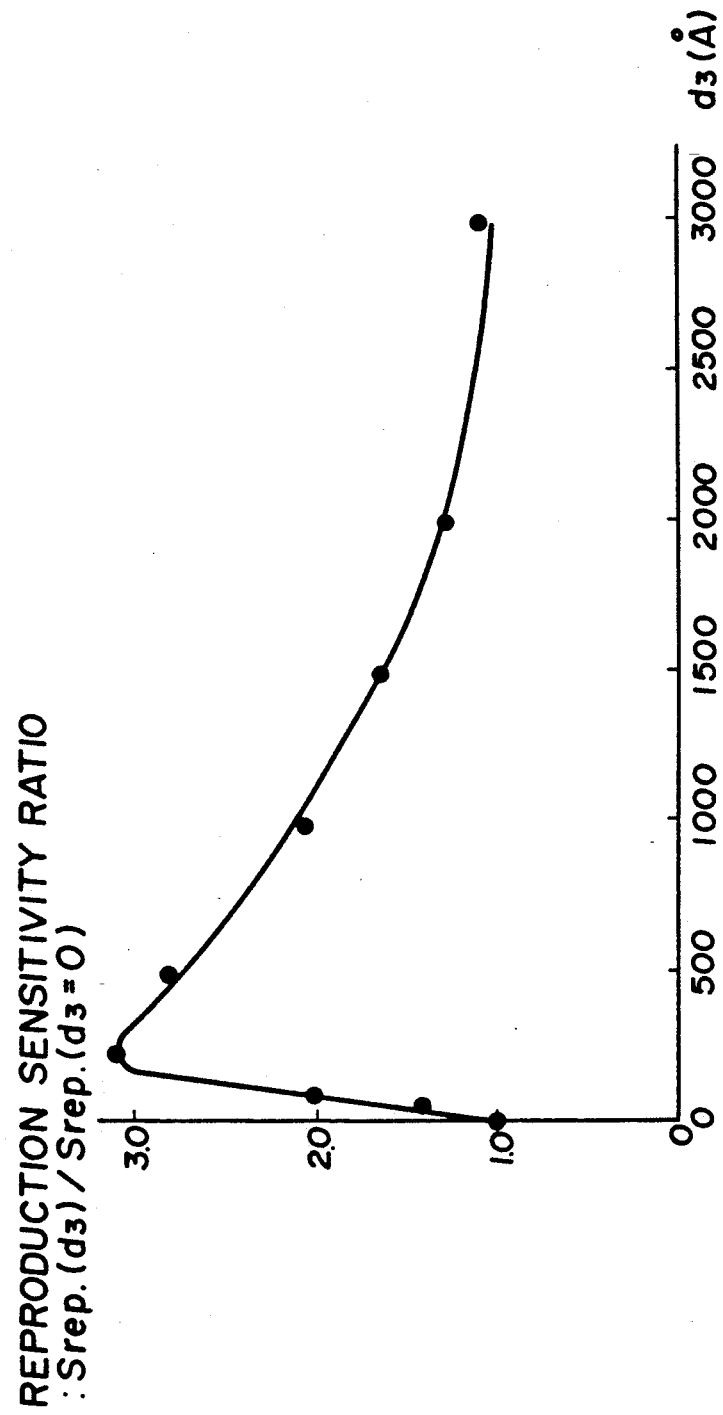
FIG. 20 plots, similarly to FIG. 7, an example of a reproduction sensitivity characteristic of the still further alternative embodiment of the triple layered structure of the magnetic recording medium.

In the magnetic recording medium of FIGS. 19 and 20, iron nitride thin films were used as a first layer or a soft magnetic thin film 9 and as a third layer or a soft magnetic thin film 11, and a Co/Pt artificial superlattice or a Co/Pd artificial superlattice, which had been subjected to heat treatment at 300° C. in the air for 30 minutes after formed, was used as a second layer or a vertical magnetization film 10.

In FIG. 19, it is assumed that the thickness $d_1$ of the first layer or the soft magnetic thin film 9 and the thickness $d_2$ of the second layer or the vertical magnetization film 10 are 1.0 micrometer, that the recording sensitivity Srec when the thickness $d_3$ of the third layer or the soft magnetic thin film 11 is varied is defined as $Srec(d_3)$, and that the recording sensitivity Srec when the thickness $d_1$ of the first layer or the soft magnetic thin film 9 and the thickness $d_2$ of the second layer or the vertical magnetization film 10 are made 1.0 micrometer, and the thickness $d_3$ of the third layer or the soft magnetic thin film 11 is made 0 micromter is defined as $Srec(d_3=0)$. The ratio $Srec(d_3)/Srec(d_3=0)$ of the two recording sensitivities is shown in respect of the thickness $d_3$.

Similarly, in FIG. 20, it is assumed that the thickness $d_1$ of the first layer or the soft magnetic thin film 9 and the thickness $d_2$ of the second layer or the vertical magnetization film 10 are 1.0 micrometer, that the reproduction sensitivity Srep when the thickness $d_3$ of the third layer or the soft magnetic thin film 11 is varied is defined as $Srep(d_3)$, and that the reproduction sensitivity Srep when the thickness $d_1$ of the first layer or the soft magnetic thin film 9 and the thickness $d_2$ of the second layer or the vertical magnetization film 10 are made 1.0 micrometer, and the thickness $d_3$ of the third layer or the soft magnetic thin film 11 is made 0 micrometer is defined as $Srep(d_3=0)$. The ratio $Srep(d_3)/Srep(d_3=0)$ of the two reproduction sensitivities is plotted also with respect to the thickness $d_3$.

Also as may be understood from those figures, the recording sensitivity Srec and the reproduction sensitivity Srep are both enhanced. Both the recording sensitivity Srec and the reproduction sensitivity Srep take their maximum values when the thickness $d_3$ of the third layer or the soft magnetic thin film 11 is 300 angstroms. In contrast, further increase in the thickness $d_3$ tends to decrease both recording sensitivity Srec and reproduction sensitivity Srep.

Next, the recording sensitivity Srec and the reproduction sensitivity Srep vary similarly to those of FIGS. 15 and 16 when the thickness $d_2$ of the second layer or the vertical magnetization film 10 is varied under the conditions that the thickness $d_1$ of the first layer or the soft magnetic thin film 9 is 1.0 micrometer, and the thickness $d_3$ of the third layer or the soft magnetic thin film 11 is 300 angstroms.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

For example, although the stainless steel substrate 8 is used as the substrate of the magnetic recording medium 13, other materials may also be used. For example, nonmagnetic polyimide substrate may be employed. In addition, a soft magnetic thin film such as of ferrite or sendust may be used as the first layer or the soft magnetic thin film 9, or the third layer or the soft magnetic thin film 11, and a vertical magnetization film such as CoO or RE-TM may be employed as the second layer or the vertical magnetization film 10. Accordingly, it is intended that the invention be limited only by the scope of the appended claims.

What is claimed is:

1. A magnetic recording medium for use in a type of magnetic printer in which a magnetic latent image is formed on said magnetic recording medium to be developed to a visible image, comprising:
   (a) a substrate having a surface;

(b) a first layer made of a soft magnetic film of a high permeability and piled on the surface of said substrate;

(c) a second layer of material, piled on said first layer, in which magnetization can be oriented substantially vertically to the surface of said substrate; and (d) a third layer made of a soft magnetic film of a high permeability and piled on said second layer.

2. A magnetic recording medium in accordance with claim 1, wherein thickness of said first layer is set between 0.01 and 10 micrometers inclusive, thickness of said second layer is set between 0.3 and 5 micrometers inclusive, and thickness of said third layer is set between 50 and 3000 angstroms inclusive.

3. A magnetic recording medium in accordance with claim 1, wherein at least one of said first layer and said third layer is made of iron nitride thin film.

4. A magnetic recording medium in accordance with claim 3, wherein a composition of said iron nitride thin film is defined by a formula $Fe_{100-x}N_x$, where x falls in a range of 1 through 15 atom %.

5. A magnetic recording medium in accordance with claim 3, wherein thickness of said first layer is set between 0.01 and 10 micrometers, and thickness of said third layer is set between 50 and 3000 angstroms.

* * * * *